US012346817B2

(12) United States Patent
Zoph et al.

(10) Patent No.: US 12,346,817 B2
(45) Date of Patent: *Jul. 1, 2025

(54) NEURAL ARCHITECTURE SEARCH

(71) Applicant: Google LLC, Mountain View, CA (US)

(72) Inventors: Barret Zoph, Sunnyvale, CA (US);
Yun Jia Guan, Stanford, CA (US);
Hieu Hy Pham, Redwood City, CA
(US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/232,803

(22) Filed: Apr. 16, 2021

(65) Prior Publication Data

US 2021/0232929 A1 Jul. 29, 2021

Related U.S. Application Data

(63) Continuation of application No. 16/859,781, filed on Apr. 27, 2020, now Pat. No. 10,984,319, which is a (Continued)

(51) Int. Cl.
G06N 3/082 (2023.01)
G06N 3/04 (2023.01)
(Continued)

(52) U.S. Cl.
CPC ............ G06N 3/082 (2013.01); G06N 3/04 (2013.01); G06N 3/044 (2023.01); G06N 3/045 (2023.01); G06N 3/047 (2023.01)

(58) Field of Classification Search
None
See application file for complete search history.

(56) References Cited

U.S. PATENT DOCUMENTS

2016/0180200 A1 6/2016 Vijayanarasimhan et al.
2016/0232440 A1 8/2016 Gregor et al.
2017/0046614 A1 2/2017 Golovashkin et al.

FOREIGN PATENT DOCUMENTS

CN 106372648 2/2017
CN 106650922 5/2017
(Continued)

OTHER PUBLICATIONS

Shuai, Bing, et al. "Dag-recurrent neural networks for scene labeling." Proceedings of the IEEE conference on computer vision and pattern recognition. 2016. (Year: 2016).*
(Continued)

Primary Examiner — Carlos R Ortiz Rodriguez
(74) Attorney, Agent, or Firm — Fish & Richardson P.C.

(57) ABSTRACT

Methods, systems, and apparatus, including computer programs encoded on computer storage media, for determining neural network architectures. One of the methods includes generating, using a controller neural network, a batch of output sequences, each output sequence in the batch specifying a respective subset of a plurality of components of a large neural network that should be active during the processing of inputs by the large neural network; for each output sequence in the batch: determining a performance metric of the large neural network on the particular neural network task (i) in accordance with current values of the large network parameters and (ii) with only the subset of components specified by the output sequences active; and using the performance metrics for the output sequences in the batch to adjust the current values of the controller parameters of the controller neural network.

20 Claims, 4 Drawing Sheets

Related U.S. Application Data continuation of application No. PCT/US2018/058041, filed on Oct. 29, 2018.

(60) Provisional application No. 62/578,361, filed on Oct. 27, 2017.

(51) Int. Cl.
  G06N 3/044 (2023.01)
  G06N 3/045 (2023.01)
  G06N 3/047 (2023.01)

(56) References Cited

FOREIGN PATENT DOCUMENTS

| JP | 2017004509 A | 1/2017 |
|---|---|---|
| JP | 2019533257 A | 11/2019 |

OTHER PUBLICATIONS

Ando, Ei, Toshio Nakata, and Masafumi Yamashita. "Approximating the longest path length of a stochastic DAG by a normal distribution in linear time." Journal of Discrete Algorithms 7.4 (2009): 420-438. (Year: 2009).*
Zoph, Barret, and Quoc V. Le. "Neural architecture search with reinforcement learning." arXiv preprint arXiv:1611.01578 (2016). (Year: 2016).*
Dutta, Bhaskar, Anders Wallqvist, and Jaques Reifman. "PathNet: a tool for pathway analysis using topological information." Source code for biology and medicine 7 (2012): 1-12. (Year: 2012).*
Srivastava, Rupesh K., Klaus Greff, and Jürgen Schmidhuber. "Training very deep networks." Advances in neural information processing systems 28 (2015). (Year: 2015).*
Tishby, Naftali, and Noga Zaslavsky. "Deep learning and the information bottleneck principle." 2015 IEEE information theory workshop (ITW). IEEE, 2015. (Year: 2015).*
Liu, Bo, et al. "Deep Neural Networks for High Dimension, Low Sample Size Data." IJCAI. vol. 2017. 2017. (Year: 2017).*
Ioannou, Yani Andrew. Structural priors in deep neural networks. Diss. 2018. (Year: 2018).*
Imai, Shunsuke, and Hajime Nobuhara. "Stepwise pathnet: Transfer learning algorithm to improve network structure versatility." 2018 IEEE International Conference on Systems, Man, and Cybernetics (SMC). IEEE, 2018. (Year: 2018).*
IN Office Action in Indian Application No. 202027017927, dated Jun. 23, 2021, 6 pages (with English translation).
JP Office Action in Japanese Application No. 2020-523808, dated Jun. 21, 2021, 9 pages (with English translation).
Anonymous, "Faster Discovery of Neural Architectures by Searching for Paths within a Large Model" ICLR, 2018, 15 pages.
Brock et al, "SMASH: One-Shot Model Architecture Search through HyperNetworks" arXiv, Aug. 2017, 21 pages.
PCT International Preliminary Report on Patentability in International Application No. PCT/US2018/058041, dated May 7, 2020, 9 pages.
PCT International Search Report and Written Opinion in International Application No. PCT/US2018/058041, dated Feb. 13, 2019, 15 pages.
Pham et al., "Efficient Neural Architecture Search via Paramater Sharing" arXiv, Feb. 2018, 11 pages.
Zoph et al., "Neural Architecture Search with Reinforcement Learning" arXiv, Feb. 2017, 16 pages.
EP Office Action in European Appln. No. 18807483.5, dated Sep. 15, 2022, 6 pages.
Office Action in Japanese Appln. No. 2022-41344, dated Apr. 24, 2023, 9 pages (with—English Translation).
Office Action in Indian Appln. 202027017927, dated Aug. 24, 2023, 3 pages (with English translation).
Office Action in Chinese Appln. No. 201880075801.0, dated Apr. 30, 2024, 7 pages (with English translation).
Office Action in Chinese Appln. No. 201880075801.0, dated Feb. 2, 2024, 24 pages (with English translation).
Ahmed et al., "Connectivity learning in multi-branch networks," CoRR, Submitted on Dec. 2017, arXiv:1709.09582v2, 17 pages.
Bahdanau et al., "Neural machine translation by jointly learning to align and translate" CoRR, Submitted on May 2016, arXiv:1409.0473v7, 15 pages.
Baker et al., "Designing Neural Network Architectures Using Reinforcement Learning," Presented in ICLR, 2017, 18 pages.
Bello et al., "Neural Optimizer Search With Reinforcement Learning," Presented at ICML, Jul. 2017, 10 pages.
Bottou, "A theoretical approach to connectionnist learning; Application to automatic speech recognition" PhD thesis, 1991, 239 pages (with English abstract).
Cai et al., "Reinforcement learning for architecture search by network transformation," CoRR, Submitted on Jul. 2017, arXiv:1707.04873v1, 10 pages.
Devries et al., "Improved Regularizatyion of Convolutional Neural networks with cutout," CoRR, Submitted on Nov. 2017, arXiv:1708.04552v2, 8 pages.
Gal et al., "A Theoretically Grounded Application of Dropout in Recurrent Neural networks," CoRR, Submitted on Oct. 2016, arXiv:1512.05287v5, 14 pages.
Gastaldi, "Shake-shake regularization of 3-branch residual networks," Presented at ICLR Workshop Track, 2017, 5 pages.
Ha et al., "Hypernetworks," CoRR, Submitted on Dec. 2016, arXiv:1609.09106v4, 29 pages.
He et al., "Deep Residual learning for Image Recognition," Presented at CPVR, 2016, 770-778.
He et al., "Delving deep into rectifiers: Surpassing human-level performance on imagenet classification," Presented at CVPR, 2015, 1026-1034.
Hochreiter et al., "Long short-term memory," In Neural computations, 1997, 32 pages.
Huang et al., "Densly connected convolutional networks," CoRR, Submitted on Jan. 2018, arXiv:1608.06993v5, 9 pages.
Inan et al., "Tying word vectors and word classifiers: a loss framework for language modeling," CoRR, Submitted on Mar. 2017, arXiv:1611.01462v3, 13 pages.
Ioffe et al., "Batch normalization: Accelerating deep network training by reducing internal covariate shift," CoRR, Submitted on Mar. 2015, arXiv:1502.03167v3, 11 pages.
Kingma et al., "Adam: A method for stochastic optimization," CoRR, Submitted on Jan. 2017, arXiv:1412.6980v9, 15 pages.
Krause et al., "Dynamic evaluation of neural sequence models," CoRR, Submitted on Oct. 2017, arXiv:1709.07432v2, 10 pages.
Krizahevsky, "Learning multiple layers of features from tiny images," Technical report, Apr. 8, 2009, 60 pages.
Larsson et al., "Fractalnet: Ultra-deep neural networks without residuals," CoRR, Submitted on May 2017, arXiv:1605.07648v4, 11 pages.
Lin et al., "Network in network," CoRR, Submitted on Mar. 2013, arXiv:1312.4400v3, 10 pages.
Loshchilov et al., "SGDR: Stochastic gradient descent with warm restarts," CoRR, Submitted on May 2017, arXiv:1608.03983v5, 16 pages.
Melis et al., "On the state of the art of evaluation in neural language models," CoRR, Submitted on Nov. 2017, arXiv:1707.05589v2, 10 pages.
Merity et al., "Regularizing and optimizing LSTM language models," CoRR, Submitted on Aug. 2017, arXiv:1708.02182v1, 10 pages.
Negrinho et al., "Deeparchitect: Automatically designing and training deep architectures," CoRR, Submitted on Apr. 2017, arXiv:1704.08792v1, 12 pages.
Nesterov et al., "A method for solving the convex programming problem with convergence rate o(1/k2)," Soviet Mathematics Doklady, 1983, 544-547 (with English abstract).
Saxena et al., "Convolutional neural fabrics," Advances in Neural Information Processing Systems, Barcelona, Spain, Dec. 5-10, 2016; Advances in Neural Information Processing Systems 29, Dec. 2016, 9 pages.

(56) References Cited

OTHER PUBLICATIONS

Schulman et al., "Proximal Policy optimization algorithms," CoRR, Submitted on Aug. 2017, arXiv:1707.06347v2, 12 pages.
Sutskever et al., "Sequence to sequence learning with neural networks," NIPS, 2014, 9 pages.
Szegedy et al., "Re-thinking the inception architecture for computer vision," Presented in CPVR, 2016, 2818-2826.
Veniat et al., "Learning time-efficient deep architectures with budgeted super networks," CoRR, Submitted on May 2017, arXiv:1706.00046v1, 11 pages.
Williams et al., "Function optimization using connectionist reinforcement learning algorithms.," Connection Science, 1991, 3(3): 29 pages.
Williams et al., "Simple statistical gradient-following algorithms for connectionist reinforcement learning," Machine Learning, 1992, 5-32.
Xie et al., "Aggregated residual transformations for deep neural networks," In CVPR, 2017, 1492-1500.
Zagoruyko et al., "Wide Residual Networks," CoRR, Submitted on Jun. 2017, arXiv:1605.07146v4, 15 pages.
Zaremba et al., "Recurrent neural network regularization," CoRR, Submitted on Dec. 2014, arXiv:1409.2329v4, 8 pages.
Zhong et al., "Practical Network Blocks Design with q-learning," CoRR, submitted on Aug. 2017, arXiv:1708.05552v1, 11 pages.
Zilly et al., "Re-current highway networks," In ICML, 2017, 10 pages.
Zoph et al., "Learning transferable architectures for scalable image recognition" CoRR, Submitted on Dec. 2017, 1707.07012v3, 14 pages.

* cited by examiner

NEURAL ARCHITECTURE SEARCH

CROSS-REFERENCE TO RELATED APPLICATIONS

This application is a continuation of and claims priority to U.S. application Ser. No. 16/859,781, filed on Apr. 27, 2020, which is a continuation of and claims priority to PCT Application No. PCT/US2018/058041, filed on Oct. 29, 2018, which claims priority to U.S. Provisional Application No. 62/578,361, filed on Oct. 27, 2017. The disclosures of the prior applications are considered part of and are incorporated by reference in the disclosure of this application.

BACKGROUND

This specification relates to modifying neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can determine, using a controller neural network, an architecture for a neural network that is configured to perform a particular neural network task.

Particular embodiments of the subject matter described in this specification can be implemented so as to realize one or more of the following advantages. The system can effectively and automatically, i.e., without user intervention, select a neural network architecture that will result in a high-performing neural network for a particular task. The system can effectively determine novel neural network architectures that are adapted for a particular task, allowing the resulting neural network to have an improved performance on the task.

The architecture search techniques described in this specification consume fewer computational resources and less time than existing approaches, while still determining high-performing model architectures. In particular, by limiting the search space to paths within a large model and therefore sharing parameter values between candidate architectures during a given round of search, the system effectively constrains the search space and limits the computational resources required for training while still being able to determine effective architectures that result in high-performing neural networks.

In more detail, other techniques that use a neural network to control a search through a large space of possible neural network architectures (i.e., other "automatic model design" approaches) are extremely expensive in terms of time required to determine a quality architecture and in terms of computational resources, e.g., processing power and memory, consumed by the search process. This is because the other techniques require the neural network to define an entirely new architecture at each iteration and train a neural network from scratch to evaluate each new architecture. Thus, these existing techniques (i) consume large amounts of time and computational resources at each iteration of the search process due to training the neural network and (ii) need a large amount of iterations to determine a quality architecture.

The described techniques, on the other hand, use the controller neural network to search for a path through a large neural network, i.e., search for an optimal subgraph within a large computational graph. This decreases the number of iterations required to find a quality architecture. Additionally, the described techniques employ parameter sharing across iterations of the training of the child networks discovered across iterations. This decreases the time and computational resources consumed by each iteration of the search process.

Accordingly, the described techniques are much faster and much less computationally expensive than existing automatic model design approaches. In some cases, the described techniques can both consume many fewer wall clock hours than existing automatic model design approaches and discover comparable or even better performing architectures while using 1000× fewer computational resources.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that determines, using a controller neural network, an architecture for a neural network that is configured to perform a particular neural network task.

The neural network can be configured to receive any kind of digital data input and to generate any kind of score, classification, or regression output based on the input.

For example, if the inputs to the neural network are images or features that have been extracted from images, the output generated by the neural network for a given image may be scores for each of a set of object categories, with each score representing an estimated likelihood that the image contains an image of an object belonging to the category.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

Figure 1:
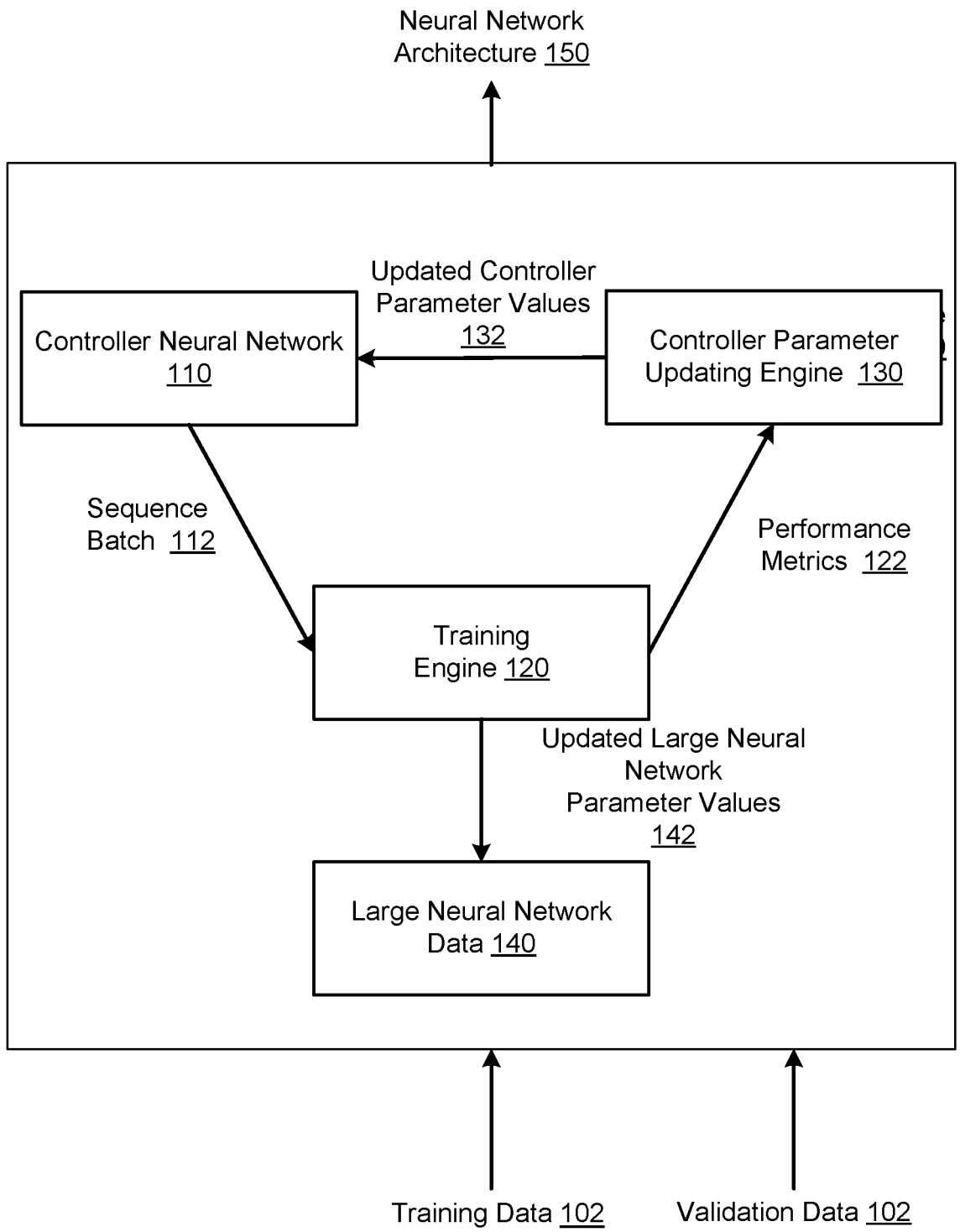
FIG. 1 shows an example neural architecture search system.

FIG. 1 shows an example neural architecture search system 100. The neural architecture search system 100 is an example of a system implemented as computer programs on one or more computers in one or more locations, in which the systems, components, and techniques described below can be implemented.

The neural architecture search system 100 is a system that obtains training data 102 for training a neural network to perform a particular task and a validation set 104 for evaluating the performance of the neural network on the particular task and uses the training data 102 and the validation set 104 to determine an architecture for a neural network that is configured to perform the particular task. The architecture defines the number of layers in the neural network, the operations performed by each of the layers, and the connectivity between the layers in the neural network, i.e., which layers receive inputs from which other layers in the neural network.

Generally, the training data 102 and the validation set 104 both include a set of neural network inputs and, for each network input, a respective target output that should be generated by the neural network to perform the particular task. For example, a larger set of training data may have been randomly partitioned to generate the training data 102 and the validation set 104.

The system 100 can receive the training data 102 and the validation set 104 in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. As another example, the system 100 can receive an input from a user specifying which data that is already maintained by the system 100 should be used for training the neural network, and then divide the specified data into the training data 102 and the validation set 104.

Generally, the system 100 determines the architecture for the neural network by determining a subset of a plurality of components of a large neural network that should be active during the processing of inputs by the large neural network. The final architecture is then the architecture of the large neural network, with only the components in the final subset active (and, optionally, any inactive components removed).

The large neural network is a neural network that contains many different neural network components, e.g., many different neural network layers, many different activation functions that can be applied by the layers, and many different possible connections between the components that can result in the large neural network generating a network output for a network input. This results in the large neural network having a vast number of parameters (referred to in this specification as "large network parameters"). By selecting a subset of components of the large neural network that should be active during processing, the system 100 identifies a high-quality architecture that is computationally feasible and that can be trained to generate high-quality network outputs.

In particular, the system 100 maintains large neural network data 140 that defines the large neural network as a directed acyclic graph (DAG), i.e., the neural network data 140 represents a DAG that defines the architecture of the large neural network and, therefore, the search space for the architecture search process. The DAG includes nodes and edges, where each node represents a computation performed by a neural network component and each edge represents a flow of information, i.e., component inputs and outputs, from one component to another. The local computations at each node have their own parameters, which are used only when the particular computation is designated active during processing. In other words, each edge from one node to another is associated with its own parameters, e.g., a parameter matrix or a kernel, that is only active when the corresponding edge is active in the current architecture, i.e., when the output node of the edge is selected as receiving input from the input node of the edge.

In some cases, the DAG specifies the entire architecture of the large neural network. In other cases, the DAG specifies a portion of the entire architecture that defines the entire architecture. In particular, in some implementations, certain portions of the large neural network architecture are fixed and not adjusted by the search process. For example, the large neural network may always be required to have a specific type of output layer, a specific type of input layer, or both. As another example, a specific type of neural network layer may be automatically inserted at fixed positions within the final architecture, e.g., a batch normalization layer before or after some or all of the layers in the neural network, a certain type of activation function applied before or after some or all of the layers in the neural network, and so on. As yet another example, when the neural network is a convolutional neural network, the neural network may always have as the last two layers of the architecture a global pooling layer followed by a softmax output layer. The global pooling layer can average all the activations of each channel of the input received by the global pooling layer.

Additionally, in some implementations, the DAG specifies a space of possible architectures for one or more types of cells, e.g., one or more types of convolutional cells or one or more types of recurrent cells, made up of multiple components. The cells specified by the DAG can then be arranged within the large neural network in a predetermined pattern to form the complete architecture of the neural network.

For example, a predetermined number of recurrent cells having the same architecture that is generated by the system, i.e., an architecture defined as a subset of the DAG, can be stacked between an embedding layer and an output layer to generate an entire large recurrent neural network architecture.

As another example, while in some implementations the DAG directly specifies the entire architecture of a convolutional neural network (except a predefined output layer), in some other implementations, by selecting a subset of the DAG, the system can can define a resolution-preserving convolutional cell that preserves the spatial resolution of its input and a reduction cell that reduces the spatial resolution of its input. Numerous instances of these two types of cells can be stacked in a predetermined pattern before an output layer to generate the final architecture of a convolutional neural network.

In some implementations, the operations and connectivity specified by the DAG can be automatically augmented with additional operations in the final architecture. For example, at some or all of the nodes in the DAG for a recurrent node, the operations specified by the DAG (and selected by the system 100) can be automatically augmented with a highway connection.

In particular, the system 100 determines the architecture, i.e., the final subset, by training a controller neural network 110 to generate an output sequence that defines the final subset.

The controller neural network 110 is a neural network that has parameters, referred to in this specification as "controller parameters," and that is configured to generate output sequences in accordance with the controller parameters. Each output sequence generated by the controller neural network 110 defines a respective subset of a plurality of components of the large neural network that should be active during the processing of inputs by the large neural network. In particular, each output sequence defines a connectivity between nodes in the DAG and the local computation that should be performed at each node.

In particular, each output sequence includes a respective output at each of multiple time steps. Each node in the DAG, i.e., each component represented by the DAG, is associated with a subset of the time steps. The outputs at time steps corresponding to a given node define the inputs to the node and the operations performed by the node (for at least the input node of the DAG, the input may be predetermined). Collectively, the outputs in a given output sequence define a subset of components that are active within the large neural network. Output sequences are discussed in more detail below with reference to FIGS. 2A-2B.

Thus, the components specified as active by a given output sequence are (i) any components that are fixed and are not part of the search process and (ii) the active components within the DAG, i.e., the parameter matrices corresponding to the connectivity defined by the output sequence and the components that perform the operations specified by the output sequence. In implementations where the output sequence directly identifies the architecture for a particular type of cell, each instance of that type of cell within the large neural network has the same active components as the instance specified by the output sequence.

The system 100 trains the controller neural network 110 by repeatedly performing each of two training phases: a controller training phase and a large neural network training phase. For example, the system 100 can repeatedly alternate between the controller training phase and the large neural network training phase. During the controller training phase, the system 100 updates the controller network parameters while holding the large network parameters fixed and during the large neural network training phase the system 100 updates the large network parameters while holding the controller parameters fixed.

In more detail, during the controller training phase, the system 110 generates, using the controller neural network 110 and in accordance with current values of the controller parameters, a batch of output sequences 112, each output sequence in the batch specifying a respective subset of the plurality of components of the large neural network that should be active during the processing of inputs by the large neural network.

For each output sequence in the batch, a training engine 120 determines a performance metric 122 of the large neural network on the particular neural network task (i) in accordance with current values of the large network parameters and (ii) with only the subset of components specified by the output sequence active. The architecture of the large neural network with only the subset of components that are specified by a given output sequence active will be referred to in this specification as the architecture defined by the given output sequence. The large network parameters are not updated during the controller training phase. That is, for each output sequence in the batch, the training engine 120 evaluates the performance of the architecture defined by the output sequence on the validation set 104 without training the large neural network, i.e., without adjusting the parameters of any of the active (or inactive) components, and instead uses the large network parameter values that were determined during the previous iteration of the large network training phase. The controller parameter updating engine 130 then uses the results of the evaluations for the output sequences in the batch 112 to update the current values of the controller parameters to improve the expected performance of the architectures defined by the output sequences generated by the controller neural network 110 on the task. Evaluating the performance of trained instances and updating the current values of the controller parameters is described in more detail below with reference to FIG. 3.

A controller parameter updating engine 130 then uses the performance metrics 122 to determine updated controller parameter values 132.

During the large neural network training phase, the training engine 120 holds the values of the controller parameters fixed and samples an output sequence using the controller neural network 110.

The training engine 120 then trains the large neural network with the architecture defined by the sampled output sequence active to determine updated large neural network parameter values 142 for those components that are active during the training. For example, the training engine 120 can train the large neural network for an entire pass through the training data 102 or for a specified number of training iterations. The training engine 120 can train the neural network using a training technique that is appropriate for the type of large neural network being trained. When the large neural network is a recurrent neural network, the training engine 120 can train the large neural network using backpropagation through time. When the large neural network is a convolutional neural network, the training engine 120 can train the large neural network using gradient descent with backpropagation.

Thus, the system 100 iteratively adjusts the controller parameter values while holding the large network parameters fixed during the controller training phase and iteratively adjusts the large network parameters while holding the controller parameter fixed during the large neural network training phase. By repeatedly performing these two phases, the system 100 trains the controller neural network 110 to generate output sequences that define high quality architectures without consuming an excessive amount of time and computational resources during the search process.

Once the controller neural network 110 has been trained, the system 100 can select a final architecture for the neural network, i.e., select a final subset of components to be active. To select the final architecture, the system 100 can generate a new output sequence in accordance with the trained values of the controller parameters and use the architecture defined by the new output sequence as the final architecture of the neural network, or can generate multiple new output sequences in accordance with the trained values and then select one of the architectures defined by the multiple new output sequences. In implementations where multiple new output sequences are generated, the system 100 can evaluate the performance of the architecture defined by each new output sequence on the validation set 104 and then select the highest-performing architecture as the final architecture. Alternatively, the system 100 can further train each selected architecture and then evaluate the performance of each of the architectures after the further training.

The neural network search system 100 can then output architecture data 150 that specifies the final architecture of the neural network, i.e., data specifying the layers that are part of the neural network, the connectivity between the layers, and the operations performed by the layers. For example, the neural network search system 100 can output the architecture data 150 to the user that submitted the training data.

In some implementations, instead of or in addition to outputting the architecture data 150, the system 100 trains an instance of the neural network having the determined architecture, e.g., either from scratch or to fine-tune the parameter values generated as a result of training the large neural network, and then uses the trained neural network to process requests received by users, e.g., through the API provided by the system. That is, the system 100 can receive inputs to be processed, use the trained neural network to process the inputs, and provide the outputs generated by the trained neural network or data derived from the generated outputs in response to the received inputs.

In some implementations, the system 100 trains the controller neural network in a distributed manner. That is, the system 100 includes multiple replicas of the controller neural network. In some of these implementations where the training is distributed, each replica has a dedicated training engine that generates performance metrics for batches of output sequences output by the replica and trains a replica of the large neural network and a dedicated controller parameter update engine that determines updates to the controller parameters using the performance metrics. Once the controller parameter update engine has determined an update, the controller parameter update engine can transmit the update to a central parameter updating server that is accessible to all of the controller parameter update engines. Similarly, once the training engine has determined an update to the large neural network parameters, the training engine can transmit the update to the parameter server. The central parameter updating server can update the values of the controller parameters and large neural network parameters that are maintained by the server and send the updated values to the controller parameter update engine. In some cases, each of the multiple replicas and their corresponding training engines and parameter updating engines can operate asynchronously from each other set of training engines and parameter updating engines.

Figure 2A:
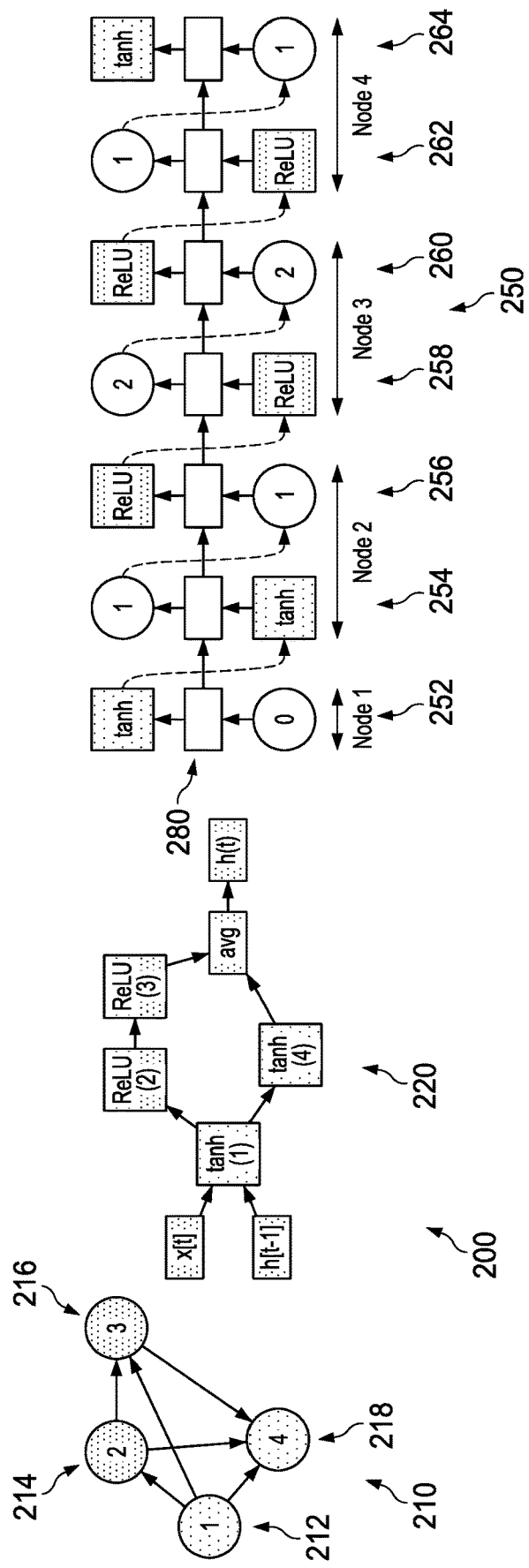
FIG. 2A is a diagram of an example recurrent cell that can be generated by the system.

FIG. 2A is a diagram 200 of an example recurrent cell that can be generated by the architecture search system.

FIG. 2A shows a DAG 210 that represents the possible connectivity of the four nodes 212, 214, 216, and 218 of the recurrent cell. The system determines the final connectivity of the DAG 210 by determining, for each node 212-218, which input the node should receive. Each possible edge within the DAG is associated with a different set of parameters, so by determining the connectivity, the system also determines which sets of parameters are active and which are not. The system also determines which operations the node should perform on the received input from a predetermined set of inputs.

FIG. 2A also shows the architecture 220 of the recurrent cell that was generated by the system using the controller neural network and a diagram 250 that shows the outputs of the controller neural network that result in the architecture 220.

In particular, the diagram 250 depicts the processing performed by the controller neural network 110 for seven example time steps 252-264 during the generation of an output sequence. As can be seen from the diagram 250, time step 252 corresponds to node 202, time steps 254 and 256 correspond to node 204, time steps 258 and 260 correspond to node 206, and time steps 262 and 264 correspond to node 208.

The controller neural network 110 is a recurrent neural network that includes one or more recurrent neural network layers, e.g., layer 280, that are configured to, for each time step, receive as input an embedding of the output generated at the preceding time step in the given output sequence and to process the input to update a current hidden state of the recurrent neural network. For example, the recurrent layers in the controller neural network 110 can be long-short term memory (LSTM) layers or gated recurrent unit (GRU) layers. In the example of FIG. 2A, at time step 254, the controller receives as input the output at the preceding time step 252 and update the hidden states of the recurrent layers.

The controller neural network 110 also includes a respective output layer for each time step in the output sequence respectively. Each of the output layers is configured to receive an output layer input that includes the updated hidden state at the time step and to generate an output for the time step that defines a score distribution over possible values of the output at the time step. For example, each output layer can first project the output layer input into the appropriate dimensionality for the number of possible output values for the corresponding time step and then apply a softmax to the projected output layer input to generate a respective score for each of multiple possible output values.

Thus, to generate an output for a given time step in an output sequence, the system 100 provides as input to the controller neural network an embedding of the output at the preceding time step in the output sequence and the controller neural network generates an output for the time step that defines a score distribution over possible output values at the time step. For the very first time step in the output sequence, because there is no preceding time step, the system 100 can instead provide a pre-determined placeholder input. The system 100 then samples from the possible values in accordance with the score distribution to determine the output value at the time step in the output sequence. The possible values that a given output can take are fixed prior to training and the number of possible values can be different for different time steps.

Figure 2B:
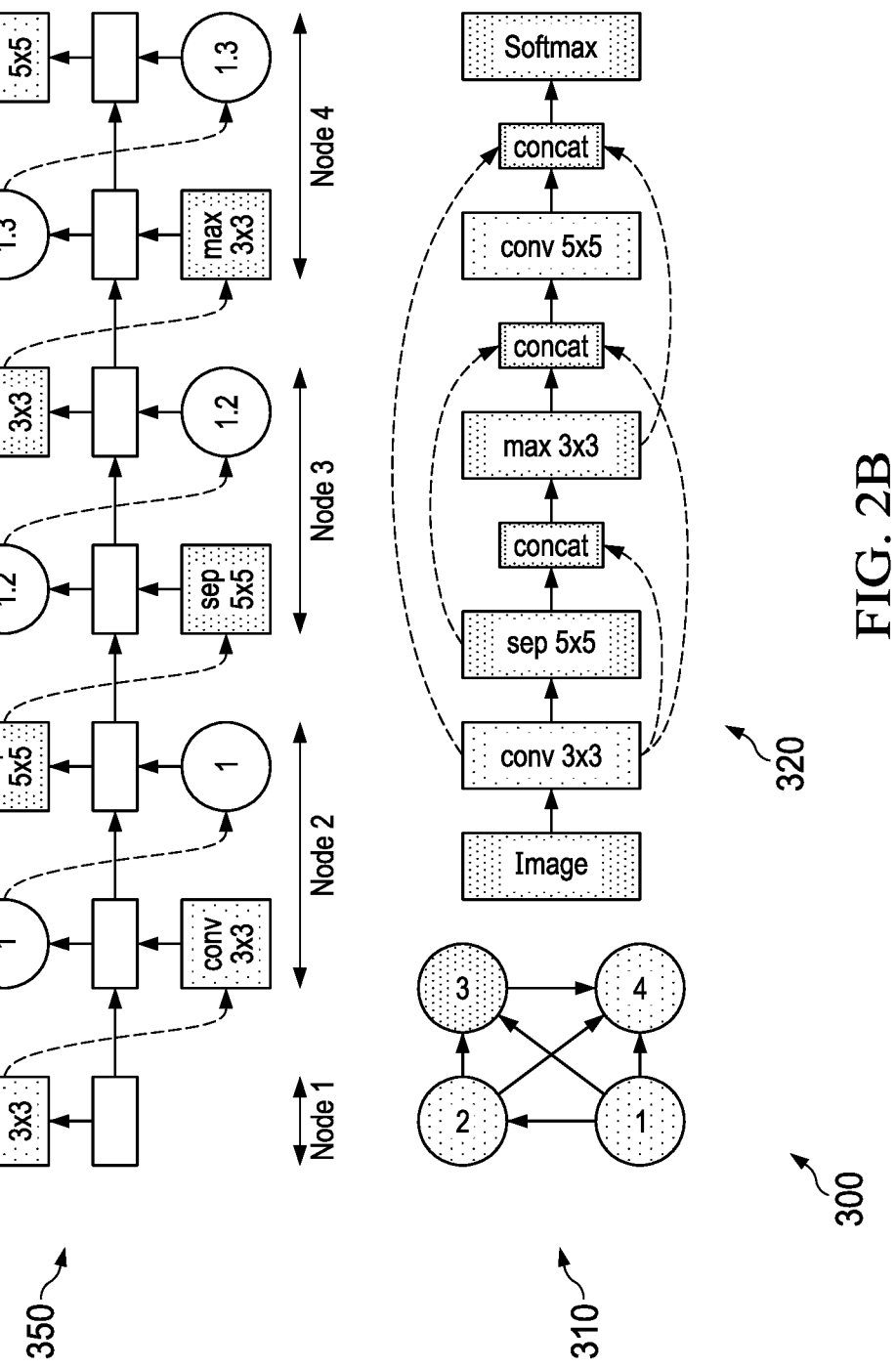
FIG. 2B is a diagram of an example of an example convolutional neural network that can be generated by the system.

As can be seen from the architecture 220, at each time step during the processing of the recurrent cell, node 212 receives as input a cell input x_t for the time step and the output of the cell for the previous time step h_t−1. This can be predetermined, i.e., not generated using the controller neural network. Thus, at the first time step 252, the controller neural network generates a probability distribution over possible activation functions to be applied by node 202. In the example of FIG. 2B, the system has selected tanh as the activation function for node 202 from sampling from the probability distribution, e.g., from a set of possible activations that includes ReLU, tanh, sigmoid, and the identity operation.

For the remainder of the nodes in the graph, the system selects both the input to the node and the activation function to be applied by the node. Thus, for node 204, the system has selected, from the corresponding probability distributions generated by the controller, that the node should receive an input from node 1 and apply the ReLu activation function. Generally, the probability distribution is over all of the nodes that are connected to the current node by an incoming edge in the DAG 210, i.e., an edge that goes from another node to the current node.

Similarly, for node 206, the system has selected that the node should receive an input from node 204 and apply the ReLu activation function while node 208 should receive an input from node 202 and apply the tanh activation function.

To generate the output of the cell for time step h_t, the system combines, e.g., averages ("avg"), the outputs of the nodes that were not chosen to provide input to any other node. In the example of FIG. 2B, the output h_t is the average of the outputs of node 206 and node 208. Thus, the overall computation of the cell given the architecture 220 can be expressed as follows:

$$h_1 = \tanh(x_t \cdot W^{(x)} + h_{t-1} \cdot W_1^h)$$
$$h_2 = ReLU(h_1 \cdot W_{2,1}^{(h)})$$
$$h_3 = ReLU(h_2 \cdot W_{3,2}^{(h)})$$
$$h_4 = \tanh(h_1 \cdot W_{4,1}^{(h)})$$
$$h_t = \frac{h_3 + h_4}{2}$$

where the Ws are parameter matrices. As can be seen from the equations above, certain components that are possible in the DAG 210 are not included in the architecture 220. In particular, parameter matrices corresponding to edges that were not selected are not used in the architecture 220. For example, the parameter matrix that is applied to inputs at node 4 to inputs from node 3 ($W_{4,3}^{(h)}$) is not active in the architecture 220. Additionally, each node applies only one activation function from the set of possible activation functions.

FIG. 2B is a diagram 300 of an example convolutional neural network architecture that can be generated by the architecture search system.

Like the diagram 200 in FIG. 2A, FIG. 2B also shows a four-node DAG 310, an architecture 320, and a diagram 350 of the processing of the controller neural network to generate the architecture 320. Here, instead of representing components of a single recurrent cell, the nodes in the DAG 310 represent layers in a convolutional neural network.

Additionally, like the example of the diagram 200, for the first node of the DAG 310, the system predetermines the inputs to the node and only selects the computation performed by the node, while for each other node, the system selects both the input to the node (from nodes that are before current node in the output sequence) and the computation performed by the node. Instead of selecting activation functions, however, the system instead selects from a different set of possible computations to be performed by the nodes. In particular, the system can select either a particular type of convolution to be performed by the node or a max pooling operation to be performed (and, optionally, an average pooling operation). The types of convolution can include, for example, a set of convolution types that includes convolutions with filter sizes 3×3 and 5×5 and depthwise-separable convolutions with filter sizes 3×3 and 5×5.

Additionally, unlike the example of the diagram 200, for some or all of the nodes in the DAG, the system can select more than one of the incoming edges to the node to be active in order to form a skip connection. In particular, for each particular node other than the first node, the controller neural network generates a respective independent probability for each of the nodes connected to the particular node by an incoming edge. The system then samples from each probability independently to determine which nodes should provide outputs to the particular node in the final architecture. When a node receives input from more than one other node, the system can depth concatenate, average, or otherwise combine the individual inputs to the node.

While not depicted, as described above, the system can instead generate one or more types of cells and repeat those cells in a predetermined pattern to generate the convolutional neural network architecture, i.e., instead of generating an entire convolutional neural network as described above.

Figure 3:
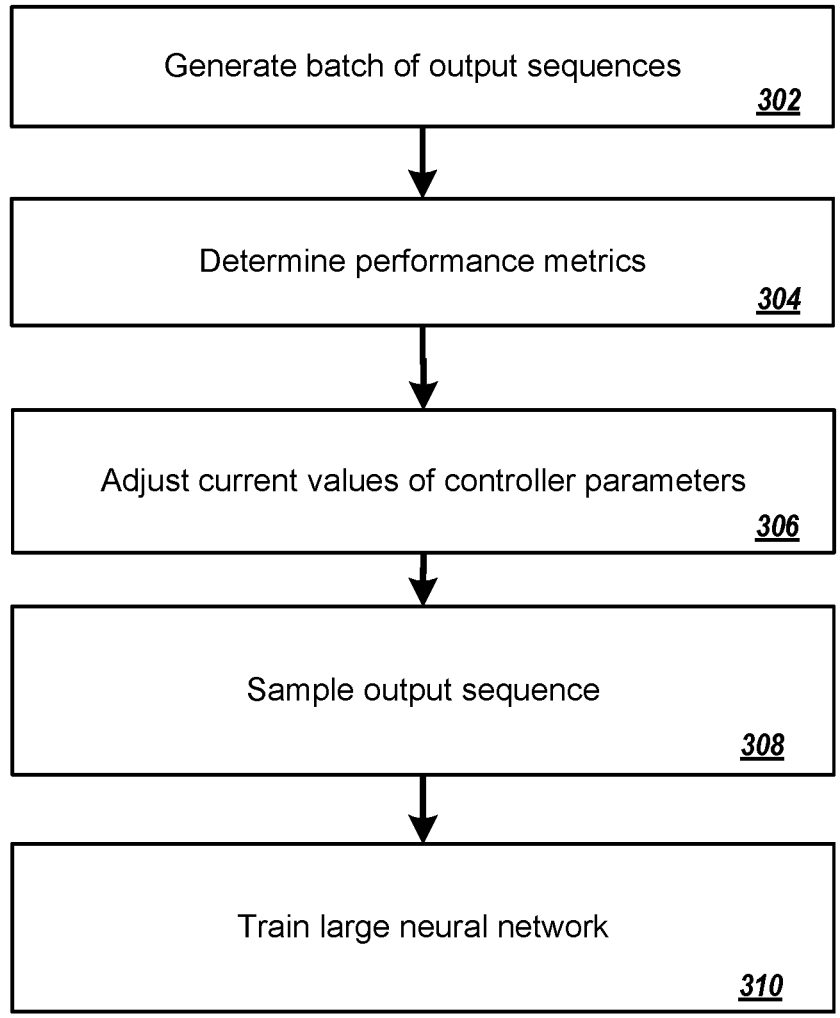
FIG. 3 is a flow diagram of an example process for training the controller neural network.

FIG. 3 is a flow diagram of an example process 300 for training the controller neural network. For convenience, the process 300 will be described as being performed by a system of one or more computers located in one or more locations. For example, a neural architecture search system, e.g., the neural architecture search system 100 of FIG. 1, appropriately programmed, can perform the process 300.

The system generates a batch of output sequences using the controller neural network and in accordance with current values of the controller parameters as of the iteration (step 302). In particular, because the system samples from a score distribution when generating each output value in an output sequence, the sequences in the batch will generally be different even though they are each generated in accordance with the same controller parameter values. The batch generally includes a pre-determined number of output sequences, e.g., eight, sixteen, thirty-two, or sixty-four sequences.

For each output sequence in the batch, the system evaluates the performance of the architecture defined by the sequence to determine a performance metric for the trained instance on the particular neural network task (step 304). For example, the performance metric can be an accuracy of an instance of the large neural network having the architecture on the validation set or a subset of the validation set as measured by an appropriate accuracy measure. For example, the accuracy can be based on a perplexity measure when the outputs are sequences or a classification error rate when the task is a classification task.

In order to perform the evaluation, the system uses the values of the large neural network parameters from the completion of the preceding iteration of the large neural network training phase. In other words, the system does not adjust the current values of the large neural network parameters when evaluating the output sequences in the batch.

The system uses the performance metrics for the architectures to adjust the current values of the controller parameters (step 306).

In particular, the system adjusts the current values by training the controller neural network to generate output sequences that result in neural network architectures having increased performance metrics using a reinforcement learning technique. More specifically, the system trains the controller neural network to generate output sequences that maximize a received reward that is determined based on the performance metrics of the generated architectures. In particular, the reward for a given output sequence is a function of the performance metric for the corresponding architecture. For example, the reward can be one of: the performance metric, the square of the performance metric, the cube of the performance metric, the square root of the performance metric, and so on.

In some cases, the system trains the controller neural network to maximize the expected reward using a policy gradient technique. For example, the policy gradient technique can be a REINFORCE technique or a Proximal Policy Optimization (PPO) technique. For example, the system can estimate the gradient of the expected reward with respect to the controller parameters using an estimator of the gradient that satisfies:

$$\frac{1}{m}\sum_{k=1}^{m}\sum_{t=1}^{T}\nabla\theta_C\log|P(a_t|a_{(t-1):1};\theta_c)(R_k-b),$$

where m is the number of sequences in the batch, T is the number of time steps in each sequence in the batch, $a_t$ is the output at time step t in a given output sequence, $R_k$ is the reward for output sequence k, $\theta_c$ are the controller parameters, and b is a baseline function, e.g., the exponential moving average of previous architecture accuracies.

The system can repeatedly perform steps 302-306 (the "controller training phase") to train the controller neural network, i.e., to determine trained values of the controller parameters from initial values of the controller parameters.

The system samples an output sequence using the controller neural network (step 308).

The system trains an architecture defined by the sampled output sequence to update the large neural network parameters of the components that are designated as active by the sampled output sequence (step 310). As described above, the system can train the architecture for a specified number of iterations or for one pass through the training data.

The system can repeatedly perform steps 308 and 310 (the "large neural network training phase") to update the values of the large neural network parameters during the training process. For example, the system can repeatedly alternate between performing steps 302-306 and performing steps 308-310 in order to search for a high performing neural network architecture.

In some implementations, the system trains the controller neural network in a distributed manner. That is, the system maintains multiple replicas of the controller neural network and the large neural network and updates the parameters values of the replicas asynchronously during the training. That is, the system can perform the steps 302-310 asynchronously for each replica and can update the controller parameters and the large neural network parameters using the gradients determined for each of the replicas.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of determining an architecture for a neural network for performing a particular neural network task, the method comprising:
    generating, in accordance with current values of a plurality of controller parameters, a batch of output sequences, each output sequence in the batch specifying a respective subset of a plurality of components of a large neural network, wherein the large neural network includes the respective subset of the plurality of components and one or more other components of the plurality of components that are not in the respective subset, wherein the large neural network has a plurality of large network parameters, wherein the large neural network comprises a plurality of layers, and wherein the respective subset of the plurality of components of the large neural network forms a smaller neural network that (i) includes only the respective subset of the plurality of components, (ii) does not include the one or more other components of the plurality of components of the large neural network that are not in the respective subset and (iii) has, for each component in the respective subset, current values of the large neural network parameters for that component;
    for each output sequence in the batch:
        determining a performance metric of the smaller neural network on the particular neural network task in accordance with current values of the large network parameters for the components in the smaller neural network; and
    using, by an updating engine, the performance metrics for the output sequences in the batch to adjust the current values of the controller parameters;
    generating, in accordance with the adjusted values of the controller parameters, a new output sequence that specifies a new subset of the plurality of components of the large neural network, the new subset of the plurality of components forming a new neural network; and
    training, by a training engine in collaboration with the updating engine, the new neural network with only the components in the new subset specified by the new output sequence on training data to determine adjusted values of the large network parameters for the components in the new subset.

2. The method of claim 1, further comprising:
    generating, in accordance with the adjusted values of the controller parameters, a new output sequence that specifies a new subset of the plurality of components of the large neural network, the new subset of the plurality of components forming a new neural network; and
    training the new neural network with only the components in the new subset specified by the new output sequence on training data to determine adjusted values of the large network parameters for the components in the new subset.

3. The method of claim 1, wherein using the performance metrics for the output sequences in the batch to adjust the current values of the controller parameters comprises:
    adjusting the current values of the controller parameters to cause generated output sequences to have increased performance metrics using a reinforcement learning technique.

4. The method of claim 3, wherein the reinforcement learning technique is a policy gradient technique.

5. The method of claim 4, wherein the reinforcement learning technique is a REINFORCE technique.

6. The method of claim 1, wherein the current values of the large network parameters are fixed while determining the performance of the smaller neural network.

7. The method of claim 1, wherein each output sequence comprises respective outputs at each of a plurality of time steps, wherein each time step corresponds to a respective node in a directed acyclic graph (DAG) that represents the large neural network, wherein the DAG comprises a plurality of edges connecting nodes in the DAG, and wherein the output sequence defines, for each node, an input received by the node and a computation performed by the node.

8. The method of claim 7, wherein generating the batch of output sequences comprises:
    generating, for each particular node of a plurality of nodes in the DAG, at a first time step corresponding to the node, a probability distribution over nodes that are connected to the particular node by an incoming edge in the DAG.

9. The method of claim 7 wherein generating the batch of output sequences comprises:
    generating, for each particular node of a plurality of nodes in the DAG, at a first time step corresponding to the node, a respective independent probability for each node that is connected to the particular node by an incoming edge in the DAG that defines a likelihood that the edge will be designated as active.

10. The method of claim 8, for each particular node of the plurality of nodes in the DAG, at a second time step corresponding to the node, generating a probability distribution over possible computations performed by the particular node.

11. The method of claim 1, wherein the large neural network is a recurrent neural network.

12. The method of claim 1, wherein the large neural network is a convolutional neural network.

13. The method of claim 1, further comprising:
    generating, in accordance with the adjusted values of the controller parameters, a final output sequence that defines a final set of components.

14. The method of claim 13, further comprising:
    performing the particular neural network task for received network inputs by processing the received network inputs with only the final set of components being active.

15. The method of claim 1, wherein each of training engine and the updating engine is implemented as one or more software or components installed on one or more computers in one or more locations.

16. A system comprising one or more computers and one or more storage devices storing instructions that when executed by the one or more computers cause the one or more computers to perform operations for determining an architecture for a neural network for performing a particular neural network task, the operations comprising:
  generating, in accordance with current values of a plurality of controller parameters, a batch of output sequences, each output sequence in the batch specifying a respective subset of a plurality of components of a large neural network, wherein the large neural network includes the respective subset of the plurality of components and one or more other components of the plurality of components that are not in the respective subset, wherein the large neural network has a plurality of large network parameters, wherein the large neural network comprises a plurality of layers, and wherein the respective subset of the plurality of components of the large neural network forms a smaller neural network that (i) includes only the respective subset of the plurality of components, (ii) does not include one or more other components of the plurality of components of the large neural network that are not in the respective subset and (iii) has, for each component in the respective subset, current values of the large neural network parameters for that component;
  for each output sequence in the batch:
    determining a performance metric of the smaller neural network on the particular neural network task in accordance with current values of the large network parameters for the components in the smaller neural network;
  using, by an updating engine, the performance metrics for the output sequences in the batch to adjust the current values of the controller parameters;
  generating, in accordance with the adjusted values of the controller parameters, a new output sequence that specifies a new subset of the plurality of components of the large neural network, the new subset of the plurality of components forming a new neural network; and
  training, by a training engine in collaboration with the updating engine, the new neural network with only the components in the new subset specified by the new output sequence on training data to determine adjusted values of the large network parameters for the components in the new subset.

17. One or more non-transitory computer-readable storage media storing instructions that when executed by one or more computers cause the one or more computers to perform operations for determining an architecture for a neural network for performing a particular neural network task, the operations comprising:
  generating, in accordance with current values of a plurality of controller parameters, a batch of output sequences, each output sequence in the batch specifying a respective subset of a plurality of components of a large neural network, wherein the large neural network includes the respective subset of the plurality of components and one or more other components of the plurality of components that are not in the respective subset, wherein the large neural network has a plurality of large network parameters, wherein the large neural network comprises a plurality of layers, and wherein the respective subset of the plurality of components of the large neural network forms a smaller neural network that (i) includes only the respective subset of the plurality of components, (ii) does not include one or more other components of the plurality of components of the large neural network that are not in the respective subset and (iii) has, for each component in the respective subset, current values of the large neural network parameters for that component;
  for each output sequence in the batch:
    determining a performance metric of the smaller neural network on the particular neural network task in accordance with current values of the large network parameters for the components in the smaller neural network;
  using, by an updating engine, the performance metrics for the output sequences in the batch to adjust the current values of the controller parameters;
  generating, in accordance with the adjusted values of the controller parameters, a new output sequence that specifies a new subset of the plurality of components of the large neural network, the new subset of the plurality of components forming a new neural network; and
  training, by a training engine in collaboration with the updating engine, the new neural network with only the components in the new subset specified by the new output sequence on training data to determine adjusted values of the large network parameters for the components in the new subset.

18. The system of claim 16, wherein using the performance metrics for the output sequences in the batch to adjust the current values of the controller parameters comprises:
  adjusting the current values of the controller parameters to cause generated output sequences to have increased performance metrics using a reinforcement learning technique.

19. The system of claim 16, wherein the current values of the large network parameters are fixed while determining the performance of the smaller neural network.

20. The system of claim 16, wherein each output sequence comprises respective outputs at each of a plurality of time steps, wherein each time step corresponds to a respective node in a directed acyclic graph (DAG) that represents the large neural network, wherein the DAG comprises a plurality of edges connecting nodes in the DAG, and wherein the output sequence defines, for each node, an input received by the node and a computation performed by the node.

* * * * *